Jan. 19, 1926.                         1,570,471
E. J. GASE
WEIGHING LIQUIDS
Filed May 15, 1923           2 Sheets-Sheet 2

INVENTOR.
Eugene J. Gase

Patented Jan. 19, 1926.

1,570,471

UNITED STATES PATENT OFFICE.

EUGENE J. GASE, OF SAGINAW, MICHIGAN, ASSIGNOR TO BAKER-PERKINS COMPANY, INC., OF WHITE PLAINS, NEW YORK.

WEIGHING LIQUIDS.

Application filed May 15, 1923. Serial No. 639,066.

*To all whom it may concern:*

Be it known that I, EUGENE J. GASE, a citizen of the United States, residing at Saginaw, county of Saginaw, and State of Michigan, have invented a certain new and useful Improvement in Weighing Liquids, of which the following is a clear, full, and exact description.

This invention relates to mechanism for weighing liquids and other materials.

In the discharge of a liquid or other flowing material into a weighing receptacle, after the balance indicates that the required amount of the material has been deposited in the receptacle and the supply is cut off, the amount of the material located between the supplying means and the mass of material in the receptacle will be added to the latter mass. The weight of the material in the receptacle will therefore be greater than that required and indicated by the weight of this added material.

The primary objects of the present invention are to improve the construction and mode of operation of weighing mechanisms of the class described and to produce a weighing mechanism of this character in which the amount of the material contained in the weighing receptacle upon the completion of the weighing operation will be as near as possible the amount required and indicated.

With these objects in view, the invention contemplates as a feature of the present invention the provision of a weighing receptacle having means for receiving the material in its passage from the supply to the mass at rest in the receptacle to weight this material in addition to that in the receptacle. Thus the balance will indicate the combined weight of the mass of material at rest in the receptacle and the weight of the material engaged by said receiving means in its passage into the receptacle. In the preferred form of the invention, the means for receiving the material in its passage into the receptacle consists of an incline connected with the receptacle on which the material rests as it is delivered into the receptacle and along which the material passes to the mass at rest in the receptacle. The weight of the material engaging this incline and passing along the same will thus be indicated by the balance as well as the weight of the material at rest in the receptacle.

Another feature of the invention consists in the provision of means for deflecting from the receptacle at least a part of the material passing from the supply to the receptacle when a predetermined amount of material has been deposited therein. The supplying means may comprise a supply pipe having a nozzle and a valve for controlling the flow of material and a connection may be provided between the valve and the deflecting means so that the deflecting means is operated to deflect the material from the receptacle upon closing the valve.

The above and other features of the present invention will be clearly understood from the accompanying drawings illustrating a mechanism embodying the invention in its preferred form and the following detailed description of the constructions therein shown.

In the drawings,

Fig. 4 is a detail view illustrating a part of the material deflecting means detached from the weighing mechanism; and Fig. 5 is a detail sectional view taken substantially on the line 5—5 of Fig. 1.

Figure 1:
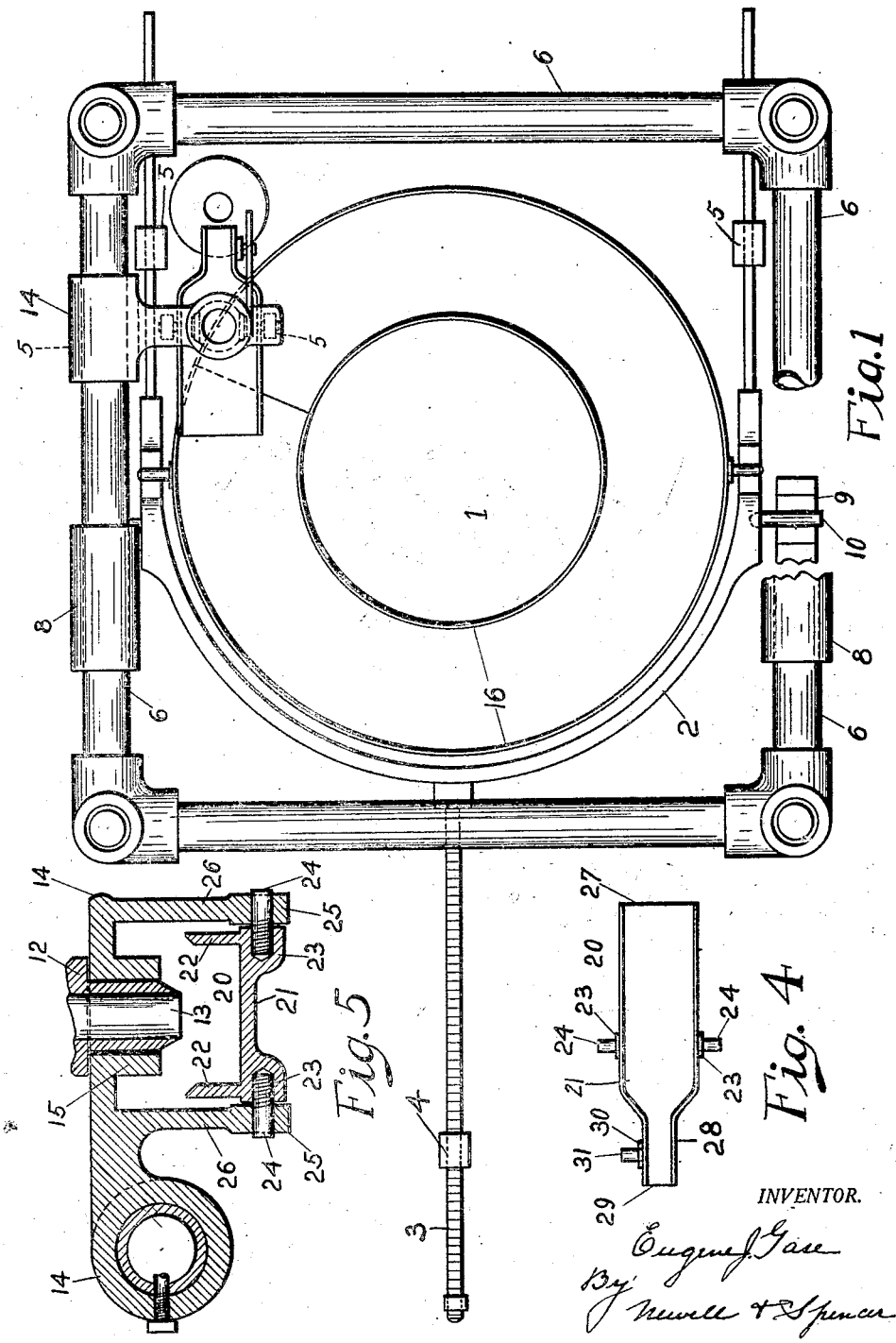
Fig. 1 is a plan view of a mechanism embodying the invention.

The weighing mechanism, in the form thereof embodying the invention as illustrated in the drawing, comprises a weighing receptacle indicated at 1, supported on a pivoted scale beam 2, provided with a graduated stem 3, on which is mounted a sliding weight 4. The scale beam is provided with a bifurcated portion or yoke embracing the weighing tank or receptacle 1 as clearly shown in Figure 1, and upon the arms of this yoke are mounted counter-weights 5, by which the weighing receptacle may be accurately balanced when empty. The scale beam is pivotally supported upon a rectangular frame 6 adapted to be supported from the ceiling 7 of the room in which the weighing mechanism is located. To support the scale beam upon the frame 6, supporting brackets 8 are mounted upon opposite sides of the frame, and are arranged to receive pins 10, secured in the opposite arms of the yoke portion of the scale beam.

As shown in the drawings, a supply pipe 11 is arranged to deliver the liquid or other material to be weighed into the weighing receptacle. This supply pipe is provided with a valve 12 for controlling the flow of material through the pipe and with an outlet or nozzle 13 located immediately above the weighing receptacle. In order to hold the nozzle of the supply pipe securely in position, the nozzle is inserted in a suitable opening in a bracket 14 attached to one of the side members of the frame 6, this bracket being provided with an annular boss or tube 15 surrounding the nozzle 13 as illustrated clearly in Figure 5. The bracket 14 may be secured in any suitable manner to one of the side members of the frame 6. As shown in the drawings of this application, the bracket is slidably mounted on one of the side members and is secured in position thereon by means of one or more set screws. This enables the bracket and the parts supported thereon to be adjusted longitudinally of the side member of the frame.

In order that the material or at least the greater part thereof between the nozzle 13 and material at rest in the weighing receptacle may be weighed with the latter material, the weighing receptacle is provided with a spiral shaped inclined channel or incline indicated at 16. This channel is arranged to fit the inner walls of the weighing receptacle and preferably extends substantially from the top of the weighing receptacle to the bottom thereof as clearly shown in Figure 2. In the form of the invention shown in the drawings, the inclined channel 16 is provided with an outer upright sidewall 17, which is attached to the outer wall of the receptacle 1, and with an inner upright side-wall 19. With this construction the material discharged from the nozzle 13 engages the channel 16 as soon as it enters the weighing receptacle and the weight of the material passing from along the incline from the top of the receptacle to the material at rest in the lower portion of the receptacle is added to the weight of the latter material and the scale beam is influenced by the entire weight of the material which has entered the receptacle.

As soon as the predetermined amount of material has been discharged into the receptacle, the valve 12 is closed either by the operator or automatically. Immediately upon closing the valve, it is of course desirable that the material between the valve and the upper end of the incline 16 be deflected out of the receptacle so that the receptacle may contain as nearly as possible the exact amount required and indicated by the scale beam. In order to deflect this material from the receptacle upon closing of the valve, a tilting chute 20 is supported beneath the nozzle 13 so that the material flowing from the nozzle will engage the chute and will thereby be directed into the receptacle in the normal operation. This chute is preferably shaped in cross section as shown clearly in Figure 5, the chute having a flat bottom 21 and upright side-walls 22. As shown in the drawings, the chute 20 is located between two parallel arms 26 formed on the bracket 14 and is pivoted to the arms of the brackets by means of pivot pins 24 threaded into projections 23 on the chute and engaging in openings in the arms of the brackets.

Figure 2:
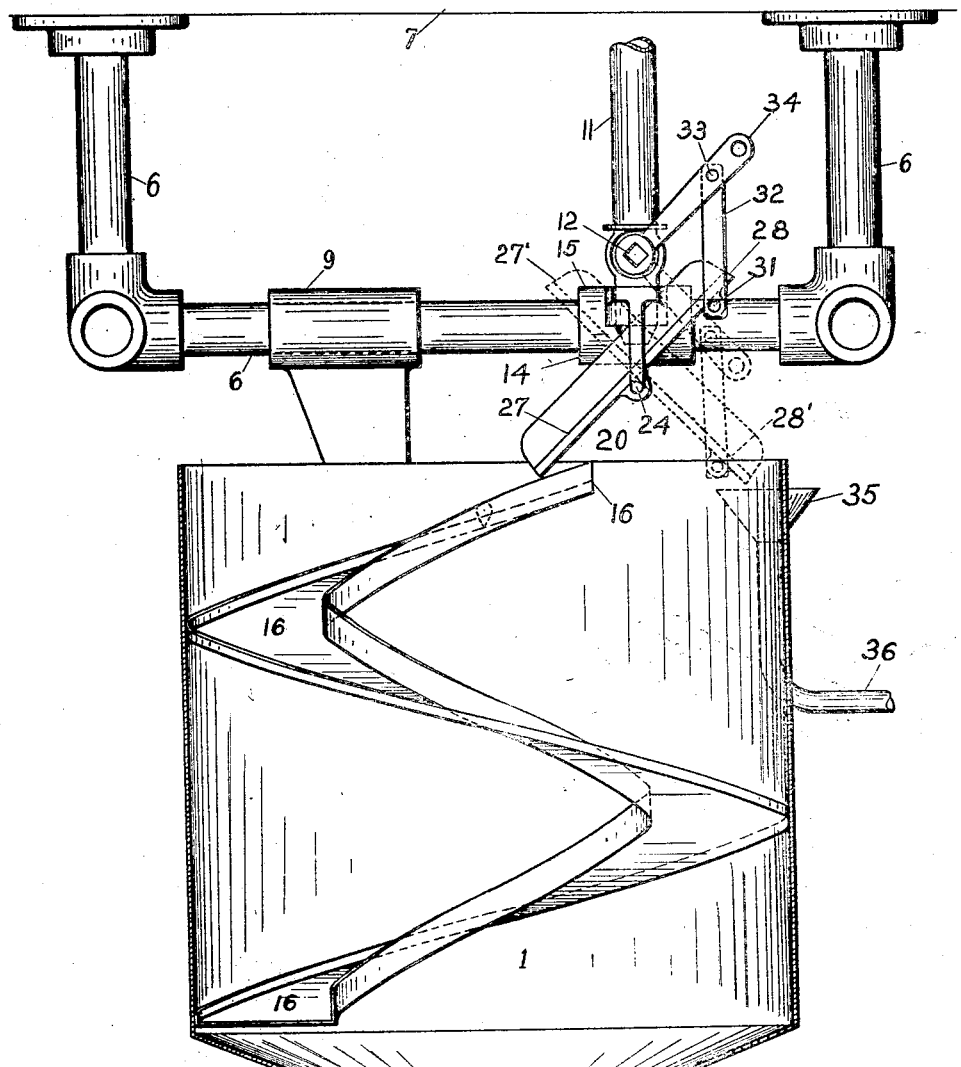
Fig. 2 is a view partly in side elevation and partly in vertical section of the mechanism shown in Fig. 1.
Figure 3:
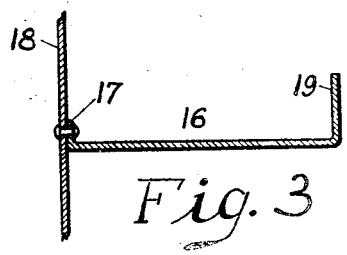
Fig. 3 is a detail view in vertical section illustrating a portion of the weighing receptacle and certain parts associated therewith.

When the chute 20 is in operating position, it occupies the position shown in full lines in Figure 2 so as to direct material received from the nozzle 13 upon the incline 16. When a predetermined amount of material has been deposited in the weighing receptacle, and the valve 12 is closed, the chute 20 is tilted about its pivotal axis into the position illustrated in dotted lines in Figure 2. By this tilting of the chute, the material upon the chute itself or at least the greater portion thereof, and the material within the nozzle 13 and between the nozzle and the chute when the valve is closed is directed outside of the receptacle as will be evident from an inspection of Figures 1 and 2. The valve 12 is provided with an operating arm or handle indicated at 34. This handle is shown in Figure 2 in the position which it occupies when the valve is open and the handle is swung downwardly into the position shown in dotted lines in this figure to close the valve. In order that the chute 20 may be tilted from its operating position into position to deflect the material outside of the receptacle upon the closing of the valve, the chute is connected with the handle 34 by means of a link 32, one end of which is connected with the chute by a pin 31, and the other end of which is connected with the handle by pin 33.

The material from the chute 20, when the latter is located in the dotted line position of Figure 2, is received in a funnel 35 located outside the receptacle and passes therefrom into a pipe 36 from which it may be collected as desired. The chute 20 is provided with an enlarged receiving end indicated at 27 in Figure 4, and with a contracted end 29 through which the material is directed into the funnel 35 when the chute is in the dotted line position.

While the mechanism disclosed in the present application is particularly desired for weighing liquid materials, it is to be understood that the invention is not limited to mechanisms for this particular purpose, but that certain features thereof may be embodied with advantage in mechanisms for weighing other materials of such a nature that they will flow from a supply means into a weighing receptacle.

It is to be understood that the invention is not limited to the particular construction and arrangement of parts of the illustrated embodiment of the invention, but that the invention may be embodied in other forms within the scope of the claims.

Having explained the nature and object of the invention, and having specifically described a mechanism embodying the invention in its preferred form, what is claimed is:

1. A weighing mechanism having in combination a weighing receptacle arranged to be moved by the weight of the contained material, means for feeding the material in a stream into said receptacle, a cut-off device for said stream, said receptacle having an inclined surface receiving the stream of material and extending from closely adjacent said cut-off downward toward the bottom of the receptacle, whereby when said cut-off operates substantially the entire stream of material flowing into the receptacle is then weighed with the mass of material at rest in the receptacle.

2. A weighing mechanism having in combination a receptacle for receiving the material to be weighed, means for movably supporting the receptacle, means for supplying the material to the receptacle arranged above the receptacle, and an incline attached to said receptacle and having its upper end located relatively close to the point of delivery of material to the receptacle for supporting continuously against direct gravitational action the material delivered to the receptacle until it reaches the mass at rest in the receptacle, so that the material travelling down said incline is weighed with the remainder of the material in the receptacle.

3. A weighing mechanism having in combination a weighing receptacle, means for movably supporting said receptacle and an incline extending spirally about the inside of the receptacle to receive material being delivered into the receptacle while on its way to join the mass at rest in the receptacle so that the material engaging the incline will be weighed together with the latter mass of material.

4. A weighing mechanism having in combination a weighing receptacle, means for movably supporting said receptacle, means connected with the receptacle for receiving the material being delivered into the receptacle, while on its way to join the mass at rest in the receptacle, so that this material will be weighed together with said mass, means for delivering material into the receptacle and means for deflecting out of the receptacle at least a portion of the material between said first means and the delivering means when a predetermined amount of material has been delivered to said first means and the receptacle.

5. A weighing mechanism having in combination a weighing receptacle, means for movably supporting said receptacle, a delivery pipe for delivering material to the receptacle, a valve in said pipe, a tilting chute through which the material from the said pipe is discharged into the receptacle and a connection between the valve and the chute for locating the chute in operative position when the valve is open, and for tilting the chute to deflect at least a portion of the material between the valve and the receptacle out of the receptacle when the valve is closed.

6. A weighing mechanism having in combination a weighing receptacle, means for movably supporting the receptacle, a delivery pipe having a nozzle, means connected with the receptacle for receiving material being delivered into the receptacle while on its way to join the mass at rest in the receptacle, so that said material will be weighed with said mass, and a tilting chute between the nozzle and said means through which the material from the nozzle is discharged upon said means, and means for tilting the chute to locate the chute in operating position or to deflect at least a portion of the material between the nozzle and said means out of the receptacle when a predetermined amount of material has been delivered to the receptacle.

7. A weighing mechanism having in combination a weighing receptacle, means for movably supporting the receptacle, means for delivering the material to the receptacle, and a sloping spiral channel rigidly affixed to the side wall of the receptacle, and extending about the same and having its upper end located relatively close to the point of delivery of the material to the receptacle, so that the material travelling down said channel is weighed with the remainder of the material in the receptacle.

Signed at Saginaw, Mich., this 7th day of May, 1923.

EUGENE J. GASE.